Figure 1:
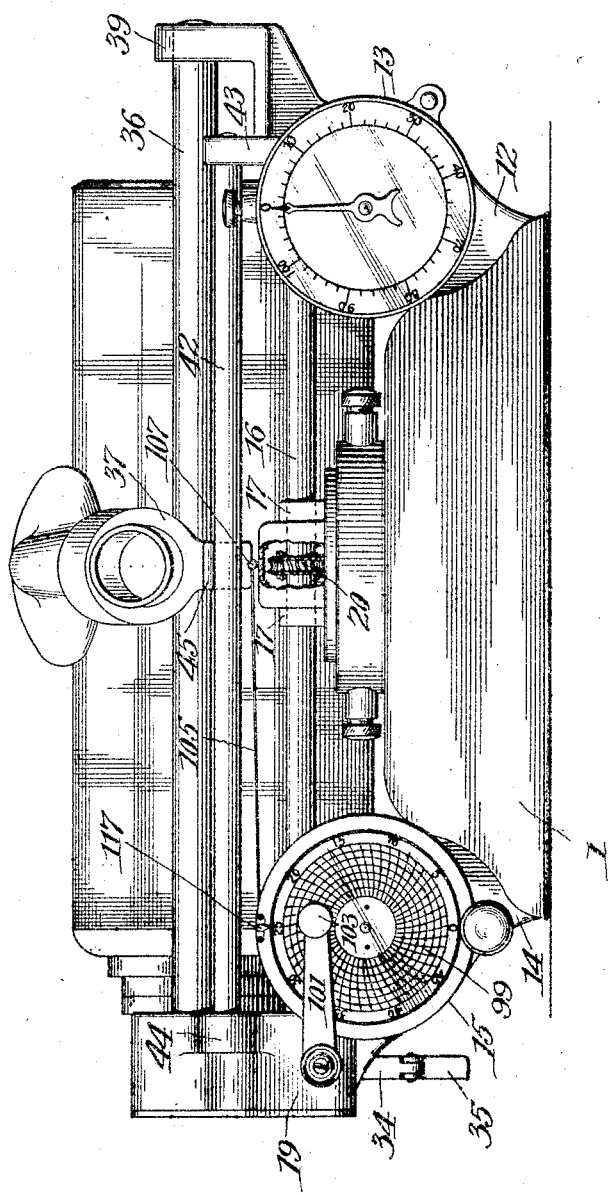

C. E. WOODS.
TALKING MACHINE.
APPLICATION FILED JAN. 24, 1914.

1,214,106.

Patented Jan. 30, 1917.
7 SHEETS—SHEET 1.

C. E. WOODS.
TALKING MACHINE.
APPLICATION FILED JAN. 24, 1914.

1,214,106.

Patented Jan. 30, 1917.
7 SHEETS—SHEET 4.

Witnesses
Jas. H. Anderson
R. C. Fitzhugh

Inventor
Clinton E. Woods
By Mauro, Cameron, Lewis & Massie
Attorneys

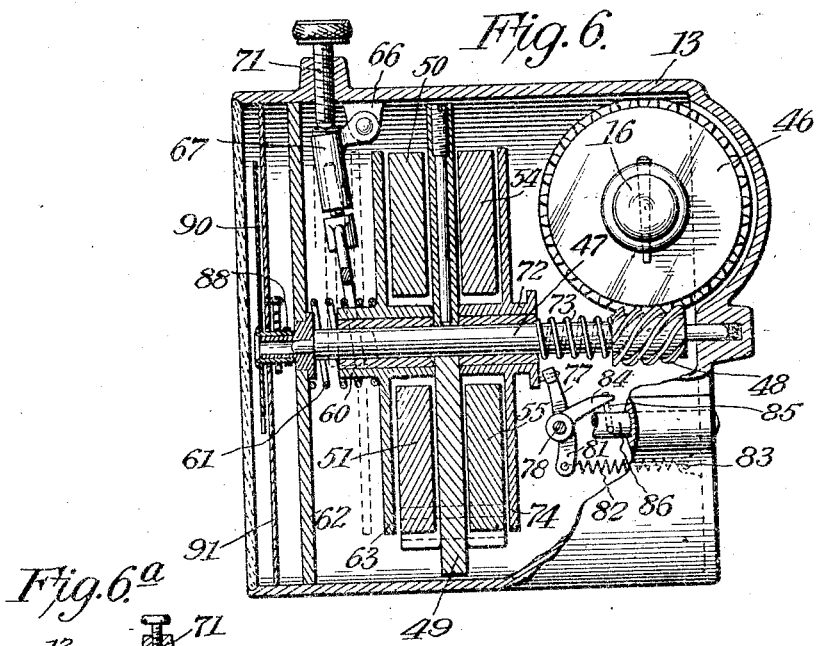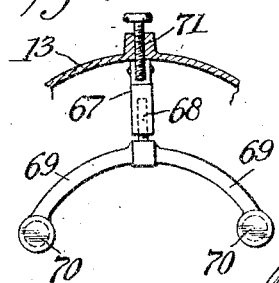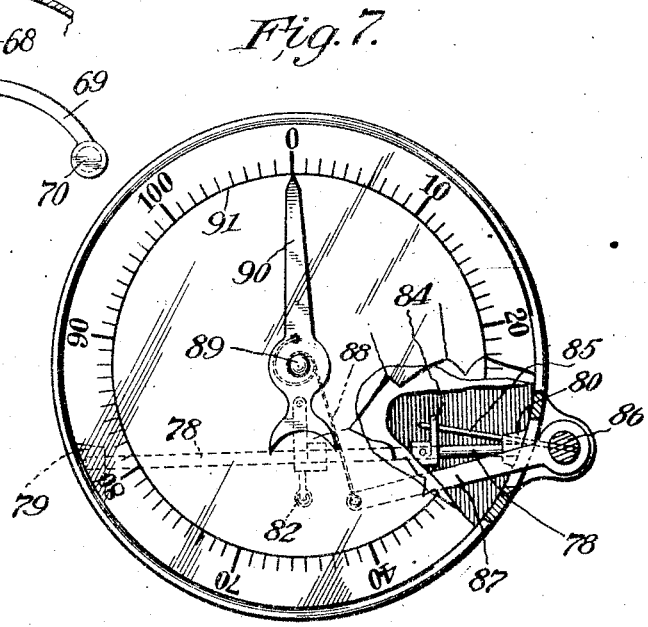

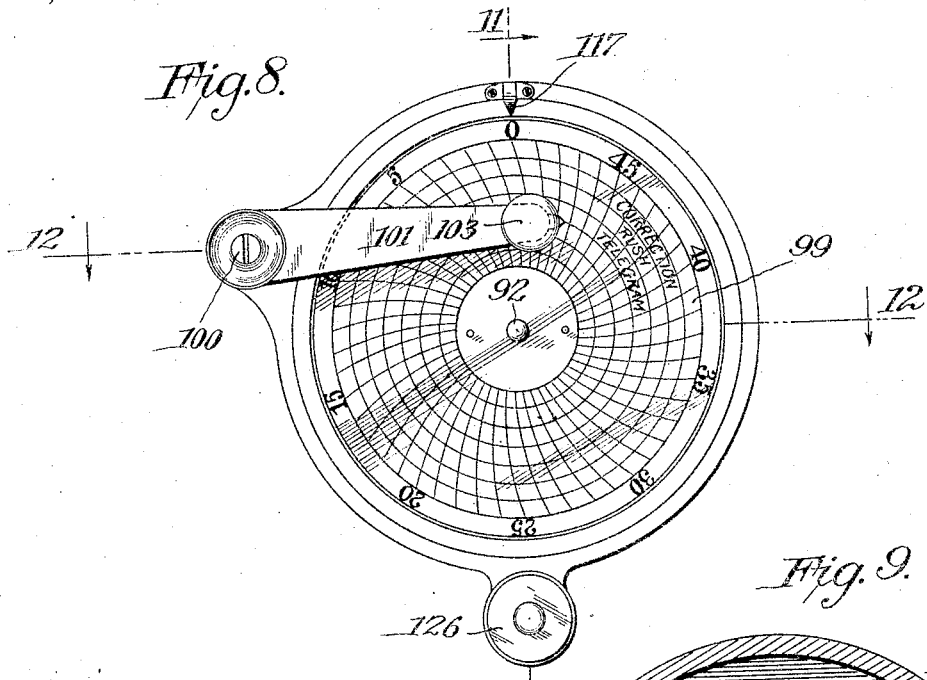
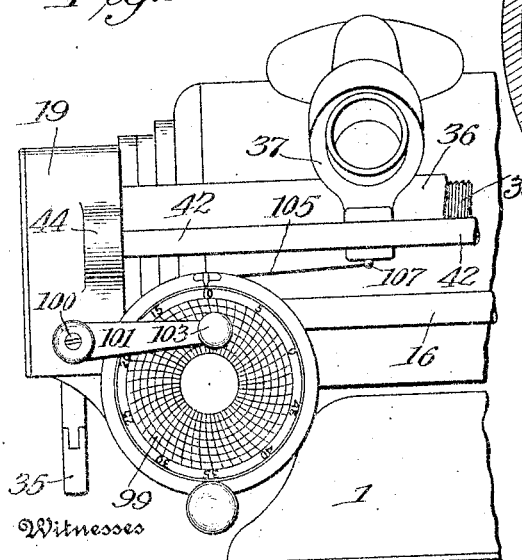
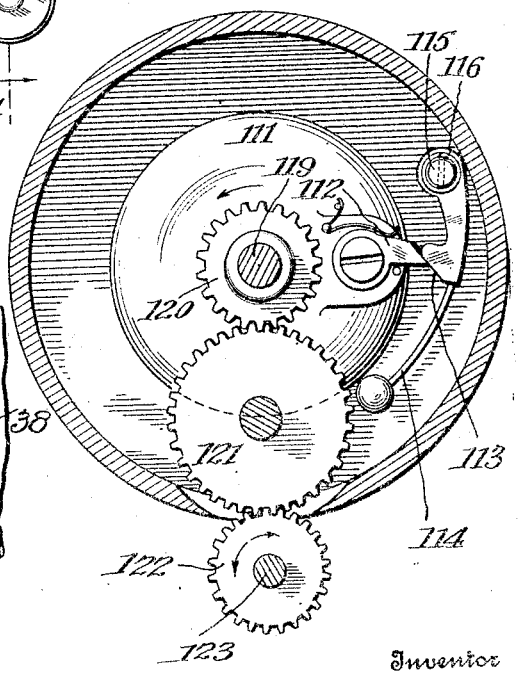

UNITED STATES PATENT OFFICE.

CLINTON E. WOODS, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

TALKING-MACHINE.

1,214,106.  Specification of Letters Patent.  Patented Jan. 30, 1917.

Application filed January 24, 1914. Serial No. 814,174.

*To all whom it may concern:*

Be it known that I, CLINTON E. WOODS, a resident of Bridgeport, Connecticut, have invented a new and useful Improvement in Talking-Machines, which invention is fully set forth in the following specification.

This invention relates to talking machines, and has for its object to produce a talking machine, or a machine of this character, of simple construction, of great compactness, and easily manipulated.

In its preferred form, and as here shown, it is designed as a machine for desk use in dictating correspondence and the like. But while specifically designed for this desk dictation purpose, it is nevertheless capable of all of the uses to which talking machines are ordinarily applied, and therefore I desire it to be expressly understood that the invention is not limited to a machine for dictation purposes.

The invention consists in a hollow base of any suitable construction, but preferably similar to the base-piece of an ordinary stand telephone, within which is mounted a motor with a vertical shaft geared to a horizontal shaft outside of the base, which horizontal shaft at one end is geared to and propels the mandrel shaft of a mandrel for supporting an ordinary cylindrical record blank or record, and at the other end is geared to a speed governor of suitable construction. Usually in dictation talking machines, commonly known as dictaphones, it is highly desirable that a correction device should be combined with the machine for the purpose of indicating to the transcriber when corrections are to be made, at what point rush work is recorded on the blank, such as telegrams, etc., and generally any other information that the dictator may wish to pass along to the transcriber. There is, therefore, preferably provided with the present invention a suitable correction device which is located on one side, here shown as the left-hand side of the machine, while a suitable scale and pointer are provided on the opposite side to indicate the speed at which the record blank or record is being driven.

Other special features of the invention will be hereinafter more fully described and then pointed out in the claims.

The inventive idea is capable of receiving a variety of mechanical expressions, one of which, for the purpose of illustrating the invention, is shown in the accompanying drawings, in which:—

Figure 2:
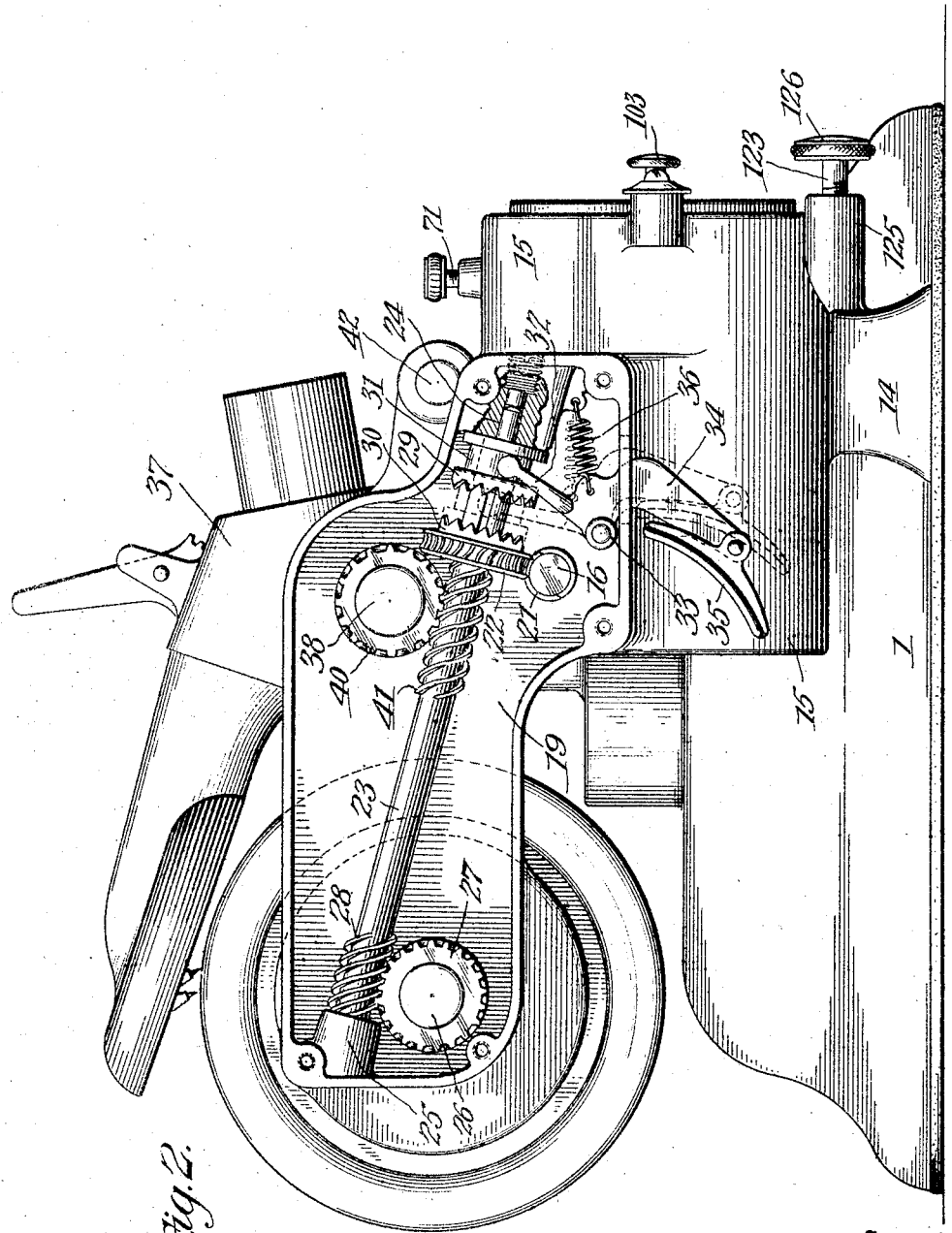
Figure 3:
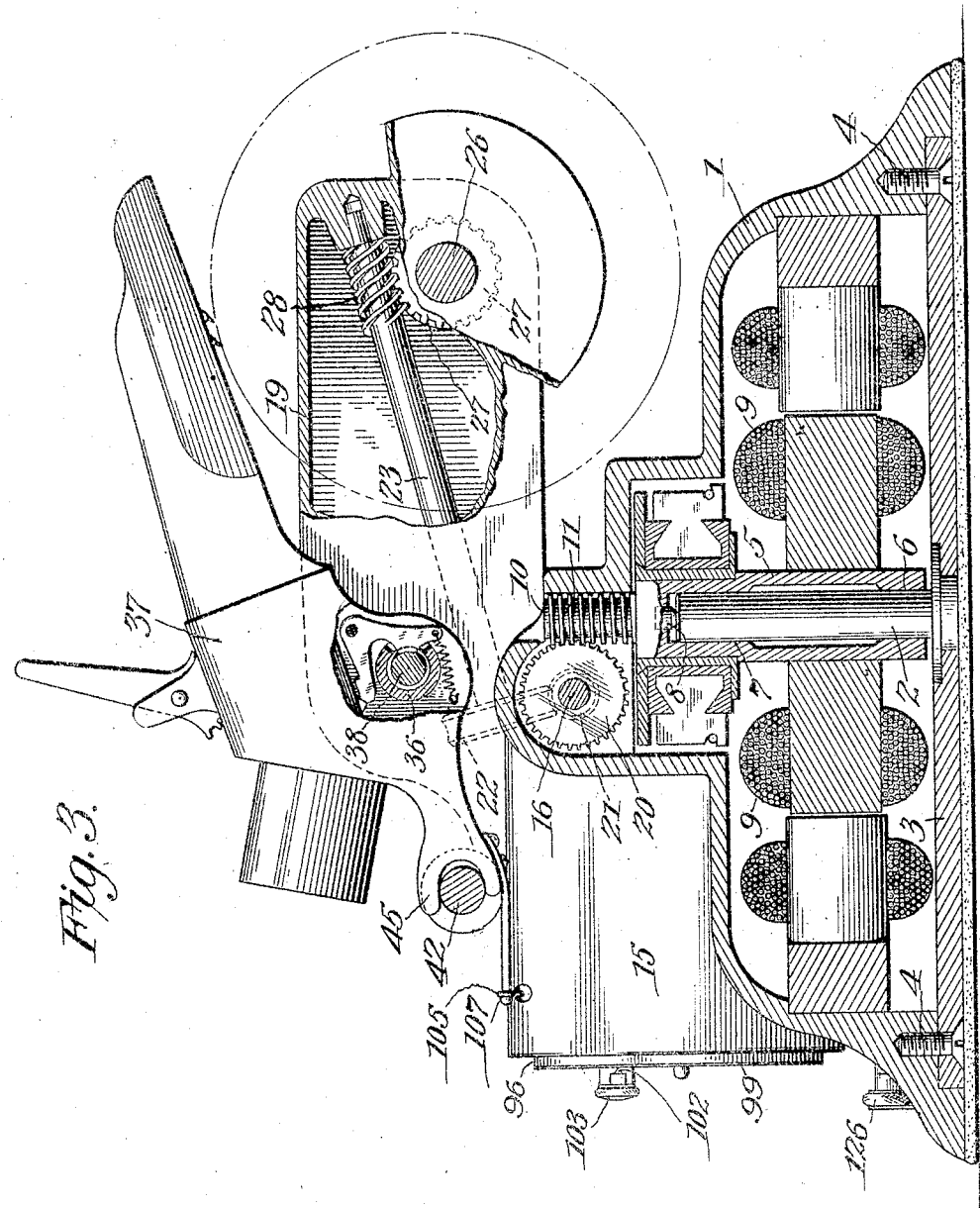
Figure 4:
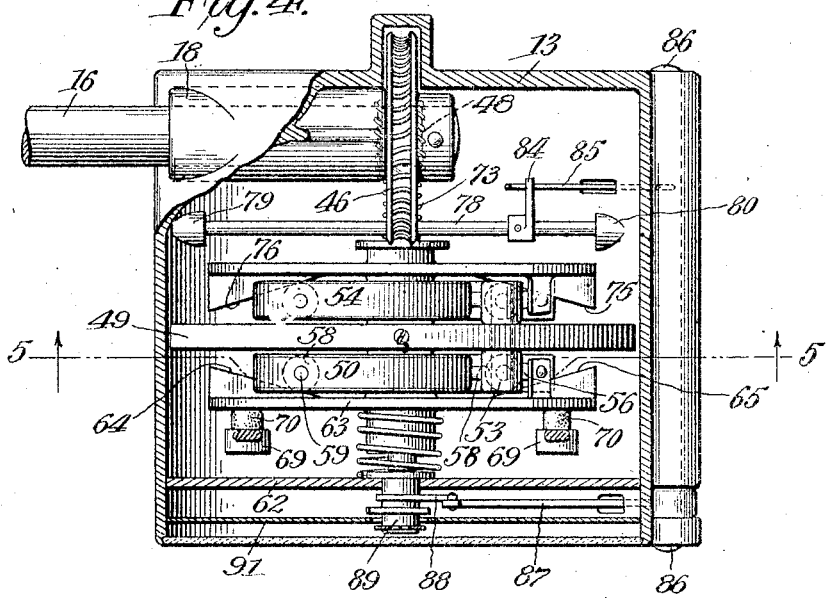
Figure 5:
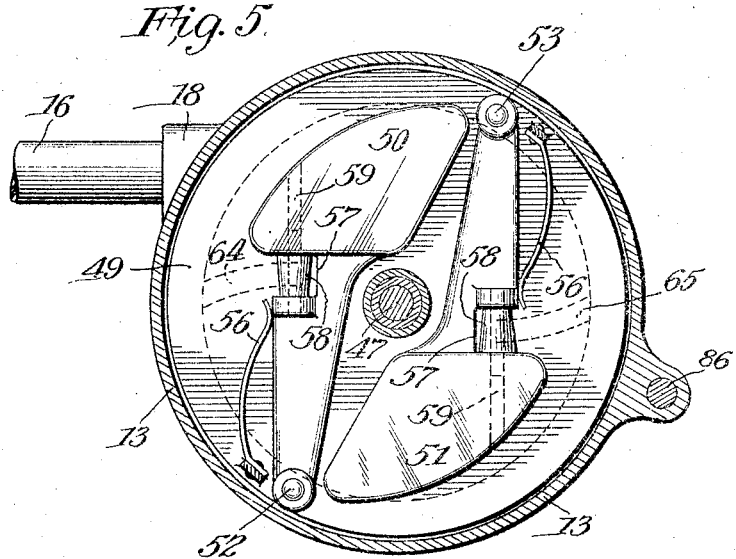
Figure 11:
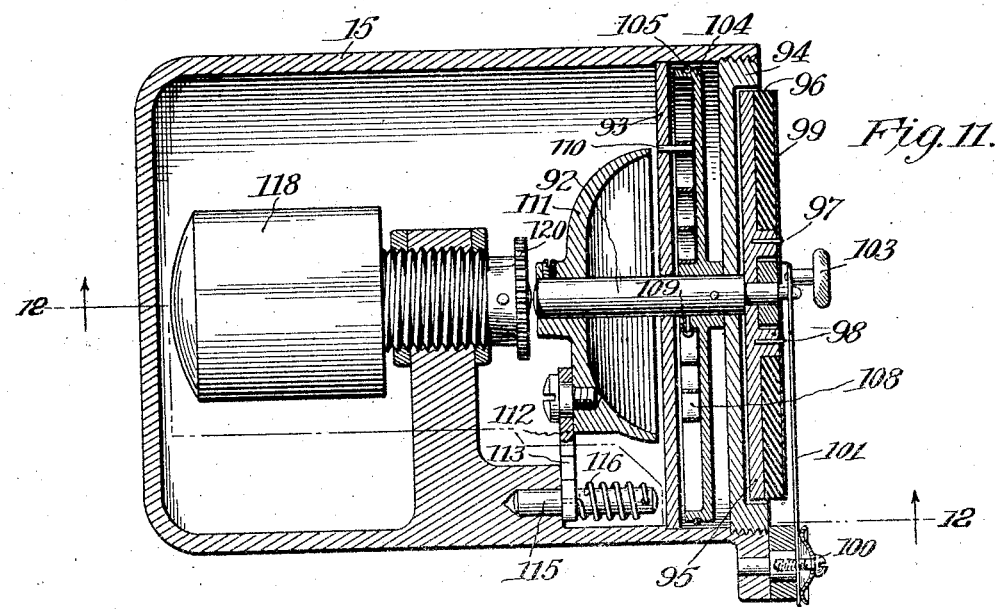
Figure 12:
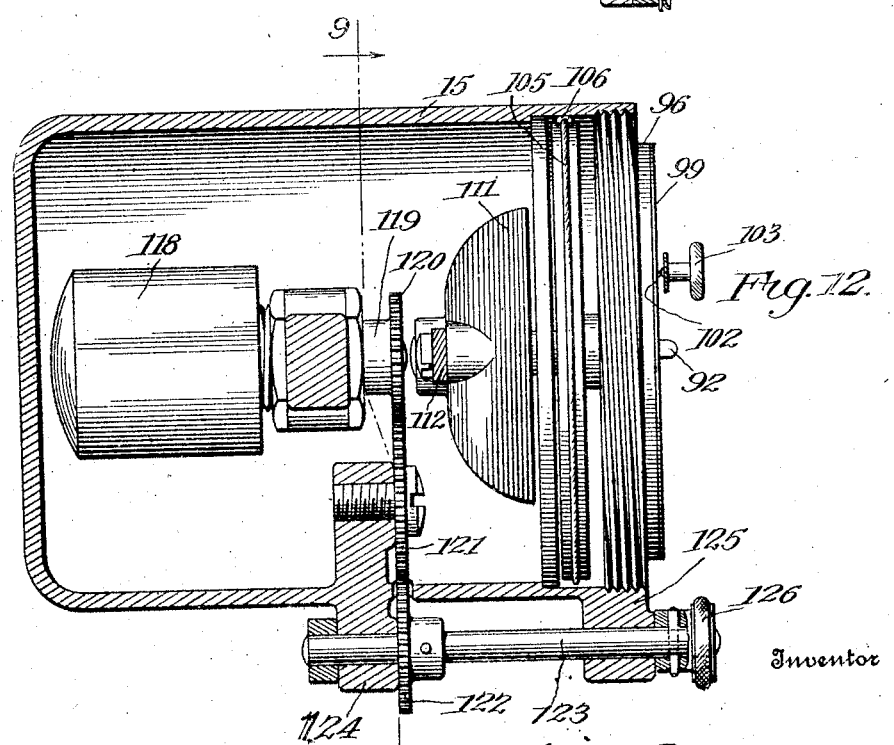

Figure 1 is a front elevation; Fig. 2 is an elevation of the left-hand end of Fig. 1, with the side plate removed and showing the gearing in elevation; Fig. 3 is a view from the right-hand end of Fig. 1, showing the base, however, in medial transverse section; Fig. 4 is a top plan view of the speed governor and speed indicating device, with inclosing casing broken away to disclose the parts; Fig. 5 is a transverse section on the line 5—5 of Fig. 4, looking in the direction of the arrows; Fig. 6 is a view, partly in section, and partly in elevation, showing the means for adjusting the speed and with means whereby movements due to the speed of the governor shaft are transmitted to the indicator point; Fig. 6ª is a detail of the friction pads and supporting means therefor; Fig. 7 is a front face view with parts broken away to show a portion of the interior mechanism; Fig. 8 is a front face view of the correction device; Fig. 9 is a transverse section thereof taken on the line 9—9 of Fig. 12, looking in the direction of the arrows; Fig. 10 is a front elevation of the left-hand end of the talking machine, showing the correction device and the connection thereof to the sound-box carriage; Fig. 11 is a vertical section on the line 11—11 of Fig. 8, looking in the direction of the arrows; and Fig. 12 is a section on the line 12—12 of Fig. 8, looking in the direction of the arrows.

Referring to the drawings, in which similar reference numerals indicate corresponding parts, 1 is a base, preferably of metal and of any suitable shape, but preferably circular in horizontal cross-section, and also hollow.

2 is an upright post centrally and rigidly mounted on a base-plate 3 secured to the frame of the base in any suitable manner, as by the screws 4, to the end that the base-plate may be removed to give access to the shell of the base 1.

5 is a hollow motor shaft having bearing, at 6 and 7, on the bottom and top portions respectively of the post 2, and preferably the said post has formed in the top thereof a depression within which a conically formed pin 3 bears to take the downward vertical thrust of the motor shaft 5. This shaft is here shown as the motor shaft of any suitable electrical motor 9, and has on its upwardly projecting end a solid portion on which is formed a worm 10 housed in an upwardly projecting part of the base 1, so that the said worm has bearing within the housing, as shown at 11, to receive any side thrust of the worm.

Referring to Fig. 1, 12 is a web formed on the base 1 and serving to secure an abutment 13, here shown in the form of a hollow cylindrical part, within which is mounted a speed-indicating mechanism. On the base 1 opposite to the web 12 is a web 14, by which an abutment 15 is secured to the base 1, which abutment, like the abutment 13, is preferably cylindrical and hollow and within which there is mounted the operating mechanism of the correction device.

Above the base 1 is a horizontal shaft 16 which has bearing at its central portion in upwardly projecting ears 17 (Fig. 1) formed on the upper portion of the base 1, and at its right-hand end has bearing in the abutment 13, as shown at 18 in Fig. 4, while its left-hand end has bearing in the abutment 15, or, preferably as shown, in a part or casting 19 formed integrally with the abutment 15, which casting is in the form of a hollow gear box (see Fig. 2). Keyed to the shaft 16 is a worm-gear 20 (Figs. 1 and 3) meshing with the worm 10 on the shaft 2. On the left-hand end of the shaft 1 which projects into the gear box 19 is a worm 21 (Fig. 2) meshing with a worm-gear 22 loose on a shaft 23 having bearing at 24 and 25 in said gear box. A mandrel shaft 26 projects laterally and to the right from said gear box and is supported on said gear box in a way well known in the art for supporting mandrel shafts, so as to leave one end thereof exposed for the purpose of placing the record blank on the mandrel. Keyed to the mandrel shaft is a worm-gear 27 (Fig. 2) which meshes with a worm 28 formed on the shaft 23 close to its bearing end 25.

Splined on the shaft 23 is one member 29 of a clutch, the other member 30 being secured to or formed integrally with the worm-gear 22, and any suitable or usual means is employed for engaging and disengaging the clutch members to start and stop the machine. As here shown, a collar 31 is formed on the clutch member 29 and within this collar engages one arm 32 of a clutch-actuating lever fulcrumed at 33, while the lower or depending arm 34 of said lever projects downwardly and outwardly through the wall of the gear box 19 and preferably has thereon a finger-piece 35, by means of which the lever may be shifted on its pivot against the action of a spring 36 to close the clutch, the spring acting in the usual or well-known manner to open the clutch when pressure is relieved from the finger-piece 35. Extending between the abutments 13 and 15 is a guide or way 36 (Fig. 1), on which slides a sound-box carriage 37 of any suitable or desired construction. The guide-way 36, as is common in this art, is in the form of a hollow tube having a longitudinal slot formed on its under side, and within the tubular guide-way 36 is a feed-screw 38 having bearings in the lug 39 forming part of the abutment 13 and in the wall of the gear box 19 forming part of the abutment 15. The end of the feed-screw 38 projects through the wall of the gear box 19 (see Fig. 2) and has keyed thereto a worm-gear 40 meshing with a worm 41 on the shaft 23.

The carriage 37 is prevented from turning upon the way 36 by a rail 42 extending between a lug 43 formed on the abutment 13 and a lug 44 formed on the gear box 19, which rail is embraced by the fork-end 45 of the carriage 37 in the usual well-known way.

*Speed governor and speed indicator.*—Referring to Figs. 4–7 inclusive, 46 is a worm-gear keyed to the shaft 16 within the hollow abutment or casing 13, and 47 is a shaft having bearings in said abutment or casing and on which is formed the worm 48 meshing with the worm-gear 46. On the shaft 47 is keyed a disk 49 and to this disk two weights 50 and 51 are pivoted at the points 52 and 53, respectively, diametrically opposite to each other and adjacent to the periphery of the disk 49, and on the opposite side of the disk 49 are pivoted two weights 54 and 55, which weights are pivoted respectively on the pivots 52 and 53, which preferably extend through the disk 49, so that the two pivots carry the four weights 50, 51, 54 and 55. These weights are all similar in construction and are shaped as shown in Fig. 5, and are normally held thrown inwardly toward the shaft 47 by springs 56, but are thrown outwardly against the tension of said springs when the shaft 47 is revolved. Each of the weights has a cut-away portion 57 within which is mounted a conical anti-friction roller 58 on a pin 59, shown in dotted lines in Fig. 5.

Slidably mounted on the shaft 47 is a sleeve 60, a spring 61 being interposed between said sleeve and the wall 62 of the abutment casing. On the sleeve 60 is a circular flange or disk 63, and on the side of the disk adjacent to the weights 50 and 51 there are formed two cam surfaces 64 and 65, which cam surfaces are shown in full lines in Fig. 4 and in dotted lines in Fig. 5, and are located opposite the anti-friction rollers 57 on the respective weights. The result of this construction is that when the shaft 47 is revolved and the weights 50 and 51 are thrown outwardly against the tension of the springs 56, the anti-friction rollers 57 acting on the cams 64 and 65 impart a sliding movement to the sleeve 60 and the disk 63, (to the left in Fig. 6,) against the tension of the spring 61, as indicated by dotted lines in Fig. 6, the extent of the sliding movement depending upon the speed at which the shaft 47 is revolved.

Depending from the upper inner face of the abutment casing 13 is a lug 66 (Fig. 6), to which is pivoted an angular lever 67. Mounted to turn in and depend from this lever is a shaft 68 supporting two diverging fork-arms 69, 69, on the lower ends of which are carried the friction pads 70, 70 in front of the disk 63. A micrometer screw 71 (Fig. 6) is screw-threaded into the wall of the abutment casing 13 with its lower end bearing on the angle of the lever 67, whereby the position of the friction pads with relation to the disk 63 is adjusted.

The operation of the device will be readily understood. When the shaft 16 revolves the speed-governor shaft 47, the disk 63 is moved from left to right by the centrifugal action of the weights 50, 51 to bring the disk into contact with the friction pads 70, 70, whereby the speed of the machine is governed in a way well-known in this art. When the speed of the machine decreases, or when the machine is stopped, the spring 61 returns the disk 63 to its normal position, the weights 50, 51 being thrown inwardly toward the shaft 47 by the springs 56. Mounted on the shaft 47 on the opposite side from the sleeve 60 is a sleeve 72 free to slide on said shaft against the tension of a spring 73 having bearing on the sleeve and a suitable abutment, such as the end of the worm 48 on the shaft. On this sleeve 72 is a disk 74 having the cam surfaces 75, 76 (Fig. 4) corresponding to the cam surfaces 64 and 65 on the disk 63, and the weights 54 and 55 act on the cam surfaces 75, 76 to throw the disk 74, and with it the sleeve 72, to the right in Fig. 6 against the tension of the spring 73, when the shaft 47 is revolved. This movement of the sleeve 72 is employed to actuate a suitable indicating pointer to indicate the speed of the machine through the following mechanism: A lever 77 is keyed to a rock shaft 78 having bearings at 79 and 80 in the wall of the abutment casing 13 (see Fig. 7). One arm 81 of the lever 79 has a spring 82 secured thereto at one end, and at the other end to the casing at 83, which spring acts to hold the upper end of the lever 77 in contact with a flange of the sleeve 72. Keyed to the rock shaft 78 is a lever arm 84 (Figs. 6 and 7) which bears against a lever arm 85 fixed on a rock shaft 86 turning in bearings in the wall of the abutment casing 13. This shaft extends to near the front end of the abutment casing 13, and in front of the partition wall 62 it has secured thereto a lever arm 87, to which is connected one end of a cord 88 wound around and secured at its other end to a shaft 89 to which is secured a pointer 90 operating in connection with a scale 91. When the sleeve 72 is thrown from left to right in Fig. 6, under the influence of the centrifugal weights 54, 55, the shaft 86 is rocked through the lever arms 77, 84 and 85, thereby depressing the lever arm 87 and revolving the shaft 89 clockwise (in Fig. 7) and with it the pointer 90, the amount of this revolution of the shaft being dependent upon the extent of the sliding movement of the sleeve 72 which in turn is dependent upon the speed of the shaft 47 and therefore of the machine.

While I have thus described, with some particularity, the specific construction of the speed governor and speed-indicating device, such specific construction forms no part of the present invention and is not claimed herein, since the same is shown, described and claimed in my Patent No. 1,121,887, granted on the 22nd day of December, 1914.

*Correction device.*—Referring to Figs. 1 and 8 to 12, there is mounted in the abutment casing 15 a shaft 92 (Fig. 11) having bearing in the walls 93, 94 of said casing, with its forward end projecting outwardly through the wall 94 and having keyed thereon a disk 95 having a facing, as 96, of suitable material like rubber or felt. Two pins 97, 98 project outwardly a slight distance beyond the face of the rubber or felt facing 96, and mounted in front of the facing 96 is a correction disk or blank 99 which is preferably pressed over the pins 97, 98 so that the same puncture it and hold it in proper position. This correction disk has marked thereon a scale dividing the periphery of the disk into equal parts which are numbered from 5 to 50. The lines thus dividing the periphery are drawn from the central portion of the paper disk 99 to the periphery of said disk and are approximately radii of said disk, but for reasons hereinafter described are in the form of an arc of a circle. In addition thereto the surface of the disk is divided into concentric portions by circles of constantly increasing diameter. Pivoted on the side of the abutment casing 15, at 100, is a lever 101 having a point 102 in close proximity to the surface of the paper disk, the lever 101 being slightly elastic so as to permit it to yield toward the paper disk under pressure applied to the thumb-piece 103 to cause the point 102 to perforate the disk. Secured to the shaft 92 between the partitions 93 and 94 is a drum 104 having a cord or flexible metal strip 105 wound thereon and with one end secured to the drum, the other end passing outwardly through an opening 106 in the abutment casing 15 and being secured to the sound-box carriage 37 at 107 (see Figs. 10 and 12). Within the drum 104 is a spring 108 secured at one end to the hub of the drum at 109 and at the other end to the wall 93 at 110. The rear end of the shaft 92 projects through the wall 93 and has secured thereon a bell 111 carrying a cam lug 112 which engages the cam face 113 secured to a striker 114 mounted to turn on a shaft 115 (Fig. 11) against the tension of a spring 116. This correction device operates as follows: The disk 99 is placed in position on the front face of the device, as shown in Fig. 8, with its zero character opposite a pointer 117, the sound-box carriage 37 being in its extreme left-hand position. During the operation of the machine, as the carriage is advanced from left to right it acts through the cord 105 to revolve the shaft 92 against the tension of the spring 108, the proportion of the parts being such that by the time the sound-box carriage 37 has reached its extreme right-hand position, said shaft 92, and therefore the disk 99, will have made one complete revolution. Assuming that the sound-box carriage has advanced one-half the length of the record tablet and that at this point the dictator wishes to dictate a telegram, it is apparent that the disk 99 will have been given half a revolution and the point thereon marked "25" will therefore be immediately opposite the pointer 117. The dictator thereupon seizes the button 103 of the lever 101 and revolves said lever until it comes opposite the circle having the word "telegram" written therein, and then depresses the button puncturing a hole in the disk at that point. Instead of a puncturing point 102, a marking point, as a pencil point for example, may be readily substituted and the paper disk 99 be marked instead of punctured. If the record be taken off of the dictating machine, the disk 99 is also taken therefrom and is placed on a corresponding machine, with the record, and the transcriber observing that a telegram is recorded on the disk immediately advances the carriage until the point "25" on the disk 99 is opposite the pointer 117 and transcribes what is there recorded. Upon freeing the carriage 37 from the feed-screw, the spring 108 acts to return the disk 99 to its normal position, that is, with the zero point thereon opposite the pointer 117. The position of the cam 112 on the bell 111 is such that it trips the striker 114 just as the carriage 37 has reached its extreme right-hand position, thus serving as a signal that the limit of the record tablet has been reached.

The specific construction of the correction device herein shown and described is not claimed herein, since such construction forms the subject-matter of my Patent No. 1,153,665, granted on the 14th day of September, 1915.

The mechanism of the correction device and the signaling bell occupies only a portion of the space within the abutment casing 15, and I preferably mount in the remaining portion thereof any suitable switch 118 for switching on and off the current from the motor in the base, and which switch is operated by revolving a shaft 119 to make and break contact in any desired manner well-known in the art. For the purpose of giving the shaft 119 the turn necessary, the same has a gear wheel 120 thereon connected by an intermediate gear 121 to a gear 122 on a shaft 123 having bearing in lugs 124, 125 on the abutment casing 15, and said shaft is provided with a knob 126 by means of which the shaft may be turned for effecting the revolution of the shaft 119 to open and close the circuit.

While I have thus described my invention herein with considerable particularity, it is to be expressly understood that the invention is not limited to the details of construction described, nor to the particular proportion of parts shown, since the same may be varied within wide limits and within the terms of the claims hereto appended.

Having thus described my invention, what is claimed is:—

1. In a talking machine, the combination of a hollow base, a motor and motor shaft therein, a sound-record mandrel shaft and a driven shaft supported by said base in parallel relation, worm-gear connections between said mandrel and driven shafts for driving the mandrel shaft from the driven shaft, and worm gear connections between said motor shaft and driven shaft.

2. In a talking machine, the combination of a hollow base, a motor and vertical motor shaft therein, a sound-record mandrel shaft, a sound box feed-screw and a driven shaft all supported by said base parallel to each other, worm-gear connections between said driven shaft and said mandrel shaft and feed-screw, and worm gear connections between said motor shaft and driven shaft.

3. In a talking machine, the combination of a hollow base, a motor within said base, a vertical motor shaft having a worm on its upwardly projecting end, a bearing or support for said worm, a driven shaft having a worm-gear engaging said worm opposite said support, a sound-record mandrel shaft, and worm-gear connections between said driven shaft and mandrel shaft.

4. In a talking machine, the combination of a sound-record mandrel shaft and a sound-box carriage, with a hollow base having a post extending upwardly therein, a hollow motor shaft having bearing on the upper end and the sides of said post, a motor for driving said shaft, and driving connections between said motor shaft, the mandrel shaft and the sound-box carriage.

5. In a talking machine, the combination of a hollow base and two oppositely disposed abutments supported by said base, a motor in said base, a speed governor supported on one of said abutments and operatively connected to said motor, a sound-box carriage moved by the motor, a correction device supported on the other abutment, and operating connections between said carriage and correction device.

6. In a talking machine, the combination of a hollow base and two oppositely disposed hollow abutments supported by said base, a motor in said base, a speed governor in one of the hollow abutments and operatively connected to said motor, a sound-box carriage moved by the motor, a correction device housed in the other abutment, and operating connections between said carriage and correction device.

7. In a talking machine, the combination of a hollow base, a motor therein, a vertical motor shaft having bearing within said base, a horizontal shaft supported on said base, a worm on said motor shaft having a bearing support in the base, a worm-gear on said horizontal shaft and engaged by said worm opposite said support, a sound-record mandrel shaft and a speed governor shaft supported on said base, and driving connections between said last-named shafts and said horizontal shaft.

8. In a talking machine, the combination of a hollow base, two oppositely disposed abutments supported by said base, a sound-record mandrel shaft having bearing in but one of said abutments, a sound-box carriage, a feed-screw therefor having bearings in said abutments, a driven shaft having bearings in said abutments, a motor in said base geared to said last-named shaft between said abutments, and driving connections between said driven shaft and said feed-screw and mandrel shaft.

9. In a talking machine, the combination of a hollow base, two oppositely disposed abutments supported by said base, a sound-record mandrel shaft having bearing in one of said abutments only, a sound-box carriage, a carriage-way or support carried by said abutments, a feed-screw within said way, a driven shaft having bearings in said abutments, a motor in said hollow base and having a vertical shaft projecting upwardly therefrom and geared to said driven shaft between said abutments, and driving connections between said driven shaft and said feed-screw and mandrel shaft.

10. In a talking machine, the combination of a hollow base and two abutments on said base, a motor within the base, a vertical motor shaft having bearings in said base, a driven shaft geared thereto and having bearings in said abutments, a speed governor housed in one of said abutments, a sound record mandrel shaft, and driving connections between said driven shaft and the mandrel shaft and between said driven shaft and the speed governor.

11. In a talking machine, the combination of a hollow base, and two hollow abutments thereon, a motor in said base, a motor shaft driven thereby, a driven shaft having bearings in said hollow abutments and connected to said motor shaft, a sound-box carriage, a correction device housed in one of said hollow abutments and operatively connected to said carriage, a speed governor housed in the other hollow abutment, and connections between said driven shaft and said speed governor and sound-box carriage.

12. In a talking machine, the combination of a hollow base, a motor within said base and having a vertical motor shaft extending therefrom, two oppositely placed abutments on said base, a horizontal driven shaft having bearings in said abutments, a sound record mandrel shaft and a speed governor shaft each having bearings in one of said abutments only, and connections between one end of the driven shaft and the mandrel shaft and between the other end of said driven shaft and the speed governor shaft.

13. In a talking machine, the combination of a hollow base and two oppositely disposed hollow abutments supported thereon, a speed-indicating scale and pointer on the front face of one hollow abutment, a correction disk on the front face of the other hollow abutment and a disk operating device therein, a motor in said hollow base, a sound-record mandrel driven thereby, a speed governor in the one hollow abutment and connected to said pointer, operative connections between said governor and motor, a sound-box carriage moved by said motor, and operative connections between said carriage and correction device.

14. In a talking machine, the combination of a hollow base, a motor and vertical motor shaft therein, two oppositely disposed hollow abutments on said base, a speed governor in one of said abutments, a correction-indicating device mounted on the other abutment and operating devices therefor within said abutment, a sound-box carriage operatively connected to said devices, a sound-record mandrel-shaft, and operative connections between said motor shaft and said speed governor, sound-box carriage and mandrel shaft.

15. In a talking machine, the combination of a hollow base, a motor therein, two oppositely disposed hollow abutments on said base, a speed governor in one hollow abutment, a signaling device in the other hollow abutment, a sound-box carriage in operative relation with said signaling device, and operative connections from said motor to said speed governor and to said sound-box carriage.

16. In a talking machine, the combination of a hollow base, a motor and motor shaft therein, a sound-record mandrel shaft and a driven shaft supported by said base in parallel relation, an intermediate shaft extending at right angles to the last-named shafts, worm-gear connections between said driven shaft and said intermediate shaft, and between said intermediate shaft and said mandrel shaft, and operative connections between said motor shaft and said driven shaft.

17. In a talking machine, a motor, a sound-record mandrel, a feed-screw, a speed governor, a driven shaft, means comprising worm-gear connections for driving said mandrel and feed-screw from said shaft, means comprising worm-gear connections for driving said governor from said shaft, and means comprising worm-gear connections for driving said shaft from said motor.

18. In a talking machine, the combination of a hollow base, a motor within said base, a horizontal shaft driven therefrom, a sound-record mandrel, a feed-screw, connections between one end of said driven shaft and said mandrel and feed-screw, a speed governor, and connections between said governor and the opposite end of said driven shaft.

19. In a talking machine, the combination of a hollow base, a motor within said base, a horizontal shaft driven therefrom, a sound-record mandrel, a feed-screw, worm-gear connections between one end of said driven shaft and said mandrel and feed-screw, a speed governor, and worm-gear connections between said governor and the opposite end of said driven shaft.

20. In a talking machine, the combination of a hollow base, a motor and motor shaft therein, a sound record mandrel shaft, a sound-box feed-screw and a driven shaft supported by said base in parallel relation, an intermediate shaft extending at right angles to the last-named shafts and feed-screw, worm-gear connections between said driven shaft and said intermediate shaft, and between said intermediate shaft and said mandrel shaft and feed-screw, and operative connections between said motor shaft and said driven shaft.

In testimony whereof I have signed this specification in the presence of two subscribing witnesses.

CLINTON E. WOODS.

Witnesses:
J. S. GRIFFITH,
JOHN R. PETRIE.